US012446550B2

(12) United States Patent
Axelrod et al.

(10) Patent No.: US 12,446,550 B2
(45) Date of Patent: Oct. 21, 2025

(54) SPHERICAL TOY

(71) Applicant: T.F.H. PUBLICATIONS, INC., Neptune City, NJ (US)

(72) Inventors: Glen S. Axelrod, Colts Neck, NJ (US); Ajay Gajria, Monmouth Junction, NJ (US)

(73) Assignee: T.F.H. PUBLICATIONS, INC., Neptune City, NJ (US)

( * ) Notice: Subject to any disclaimer, the term of this patent is extended or adjusted under 35 U.S.C. 154(b) by 0 days.

(21) Appl. No.: 18/644,288

(22) Filed: Apr. 24, 2024

(65) Prior Publication Data

US 2024/0357998 A1 Oct. 31, 2024

Related U.S. Application Data

(60) Provisional application No. 63/498,024, filed on Apr. 25, 2023.

(51) Int. Cl.
*A01K 15/02* (2006.01)

(52) U.S. Cl.
CPC .................. *A01K 15/025* (2013.01)

(58) Field of Classification Search
CPC .. A01K 15/026; A01K 15/025; A01K 5/0114; A63F 9/08; A63F 9/0857; A63F 9/12; A63F 2007/0064; A63F 2009/124
See application file for complete search history.

(56) References Cited

U.S. PATENT DOCUMENTS

| | | | | |
|---|---|---|---|---|
| 4,452,454 A * | 6/1984 | Greene | ................. | A63F 9/0857 273/281 |
| 4,484,744 A * | 11/1984 | Gmunder | .............. | A63F 9/0857 273/153 S |
| 4,553,754 A | 11/1985 | Wiggs et al. | | |
| 4,836,547 A * | 6/1989 | Krikheli | ................ | A63F 9/0857 273/153 S |
| 4,889,340 A * | 12/1989 | Greene | ................. | A63F 9/0098 273/153 S |
| 5,074,562 A * | 12/1991 | Green | ................... | A63F 9/0857 273/153 S |
| 5,449,175 A * | 9/1995 | Nagy | ................... | A63F 9/0857 273/153 S |

(Continued)

FOREIGN PATENT DOCUMENTS

CN 109105290 1/2019

OTHER PUBLICATIONS

International Search Report and Written Opinion from corresponding PCT Appln. No. PCT/US2024/025926, dated Aug. 12, 2024.

*Primary Examiner* — Trinh T Nguyen
(74) *Attorney, Agent, or Firm* — Grossman, Tucker, Perreault & Pfleger, PLLC

(57) ABSTRACT

A toy comprising a sphere having a spherical first-half and a spherical second-half which are rotatable relative to one another from a first position to a second position. Each half includes a plurality of track segments. In the first position, a first position track includes at least one track segment of each half. In the second position, a second position track includes at least one track segment of each half, wherein at least one of the track segments is different from the first position track, whereby the first position track and the second position track have at least partially different track configurations.

16 Claims, 10 Drawing Sheets

(56) References Cited

U.S. PATENT DOCUMENTS

| | | | | |
|---|---|---|---|---|
| 5,575,476 | A * | 11/1996 | Yang | A63F 9/0842 |
| | | | | 273/153 S |
| 5,645,278 | A * | 7/1997 | Harris | A63F 9/0869 |
| | | | | 273/153 S |
| 5,816,571 | A * | 10/1998 | Chen | A63F 9/0857 |
| | | | | 273/153 S |
| 8,464,666 | B2 | 6/2013 | Chefetz et al. | |
| 9,409,080 | B1 * | 8/2016 | Yang | A63F 9/083 |
| 10,051,838 | B2 * | 8/2018 | Stone | A01K 15/025 |
| 10,285,380 | B1 * | 5/2019 | Mullin | A01K 15/026 |
| 2004/0065997 | A1 * | 4/2004 | Tanner | A63F 9/0857 |
| | | | | 273/153 R |
| 2005/0166865 | A1 * | 8/2005 | Handelsman | A01K 15/026 |
| | | | | 119/709 |
| 2012/0318210 | A1 * | 12/2012 | Anderson | A01K 15/025 |
| | | | | 119/710 |
| 2014/0318472 | A1 * | 10/2014 | Day | A01K 15/025 |
| | | | | 119/707 |
| 2016/0309682 | A1 * | 10/2016 | Stone | A01K 15/025 |
| 2018/0015361 | A1 * | 1/2018 | Lee | A63F 9/0857 |
| 2024/0306605 | A1 * | 9/2024 | Salyer | A01K 15/025 |

* cited by examiner

SPHERICAL TOY

CROSS-REFERENCE TO RELATED APPLICATIONS

This non-provisional patent application claims the benefit of the filing date of U.S. provisional patent application Ser. No. 63/498,024, filed Apr. 25, 2023, the entire disclosure of which is incorporated herein by reference.

FIELD

The present disclosure relates to a toy, and more particularly a spherical toy providing a plurality of at least partially different track configurations to guide a roller member therein along different paths.

BACKGROUND

Pet treat dispenser toys are known in which treats may be disposed therewith, to subsequently be removed therefrom via some interaction of a pet with the toy. The present toy expands upon the pet treat dispensers of the art.

SUMMARY

A toy comprising a sphere having a spherical first-half and a spherical second-half which are rotatable relative to one another from a first position to a second position. Each half includes a plurality of track segments. In the first position, a first position track includes at least one track segment of each half. In the second position, a second position track includes at least one track segment of each half, wherein at least one of the track segments is different from the first position track, whereby the first position track and the second position track have at least partially different track configurations.

A toy, comprising a sphere having a spherical first-half and a spherical second-half; wherein the first-half and the second-half are rotatable relative to one another from a first position to a second position; wherein the first-half comprises a plurality of first-half track segments, wherein the plurality of first-half track segments are all undercut track segments; wherein the second-half comprises a plurality of second-half track segments, wherein the plurality of second-half track segments are all undercut track segments; wherein, when the first-half and the second-half are in the first position, at least one first position track includes at least one first-half track segment of the plurality of first-half track segments and at least one second-half track segment of the plurality of second-half track segments; wherein, when the first-half and the second-half are in the second position, at least one second position track includes at least one first-half track segment of the plurality of first-half track segments and at least one second-half track segment of the plurality of second-half track segments; wherein the at least one first position track and the at least one second position track are at least partially different tracks.

In at least one embodiment, the toy further comprises at least one roller member rollable within the at least one first position track and the at least one second position track; one or more combination inlet(s)/outlet(s) to insert the at least one roller member into, and remove the at least one roller member from, respectively, the at least one first position track and the at least one second position track; wherein, the at least one first position track is configured such that, when the at least one roller member is disposed in the at least one first position track, the at least one first position track physically inhibits the at least one roller member from exiting the at least one first position track except through the one or more combination inlet(s)/outlet(s); wherein, the at least one second position track is configured such that, when the at least one roller member is disposed in the at least one second position track, the at least one second position track physically inhibits the at least one roller member from exiting the at least one second position track except through the one or more combination inlet(s)/outlet(s).

In at least one embodiment, the toy further comprises wherein at least one roller member is spherical.

In at least one embodiment, the toy further comprises wherein at least one roller member is edible.

In at least one embodiment, the toy further comprises wherein the plurality of first-half track segments and the plurality of second-half track segments all have a same undercut profile; wherein the undercut profile is a semi-circular undercut profile.

In at least one embodiment, the toy further comprises wherein the plurality of first-half track segments include a first-half first track segment and a first-half second track segment; wherein the plurality of second-half track segments include a second-half first track segment and a second-half second track segment.

In at least one embodiment, the toy further comprises wherein, when the first-half and the second-half are in the first position, the at least one first position track comprises a first position first track which includes the first-half first track segment and the second-half first track segment; wherein, when the first-half and the second-half are in the second position, the at least one second position track includes the first-half second track segment and the second-half second track segment.

In at least one embodiment, the toy further comprises wherein, when the first-half and the second-half are in the first position, the at least one first position track further comprises a first position second track which includes the first-half second track segment and the second-half second track segment.

In at least one embodiment, the toy further comprises wherein, when the first-half and the second-half are in the second position, the at least one second position track further includes the first-half first track segment and the second-half first track segment.

In at least one embodiment, the toy further comprises wherein the plurality of first-half track segments further include a first-half third track segment; wherein the plurality of second-half track segments further include a second-half third track segment.

In at least one embodiment, the toy further comprises wherein, when the first-half and the second-half are in the first position, the at least one first position track further comprises a first position first track which includes the first-half first track segment and the second-half first track segment; wherein, when the first-half and the second-half are in the first position, the at least one first position track further comprises a first position second track which includes the first-half second track segment and the second-half second track segment; wherein, when the first-half and the second-half are in the first position, the at least one first position track further comprises a first position third track which includes the first-half third track segment and the second-half third track segment.

In at least one embodiment, the toy further comprises wherein, when the first-half and the second-half are in the first position, the first position first track, the first position second track and the first position third track are isolated from one another.

In at least one embodiment, the toy further comprises wherein the first position first track further comprises a first position first continuous loop track; wherein the first position second track further comprises a first position second continuous loop track; wherein the first position third track further comprises a first position third continuous loop track.

In at least one embodiment, the toy further comprises wherein, when the first-half and the second-half are in the second position, the at least one second position track includes the first-half first track segment, the second-half first track segment, the first-half second track segment, the second-half second track segment, the first-half third track segment and the second-half third track segment.

In at least one embodiment, the toy further comprises wherein the at least one second position track further comprises a second position continuous loop track.

In at least one embodiment, the toy further comprises wherein the first-half and the second-half are rotatable relative to one another from the first position to the second position about a rotation axis; wherein the first-half and the second-half are releasably fixable relative to one another around the rotation axis at the first position and the second position.

In at least one embodiment, the toy further comprises wherein the releasably fixable relative to one another around the rotation axis at the first position and the second position by a detent mechanism.

A toy, comprising a sphere having a spherical first-half and a spherical second-half; wherein the first-half and the second-half are rotatable relative to one another from a first position to a second position; wherein the first-half comprises a first-half first track segment, a first-half second track segment and a first-half third track segment, wherein the first-half first track segment, the first-half second track segment and the first-half third track segment are undercut track segments; wherein the second-half comprises a second-half first track segment, a second-half second track segment and a second-half third track segment, wherein the second-half first track segment, the second-half second track segment and the second-half third track segment are undercut track segments; wherein, when the first-half and the second-half are in the first position, the first-half first track segment and the second-half first track segment form at least a portion of a first position first track; wherein, when the first-half and the second-half are in the first position, the first-half second track segment and the second-half second track segment form at least a portion of a first position second track; wherein, when the first-half and the second-half are in the first position, the first-half third track segment and the second-half third track segment form at least a portion of a first position third track; wherein, when the first-half and the second-half are in the second position, the first-half first track segment, the second-half first track segment, the first-half second track segment, the second-half second track segment, the first-half third track segment and the second-half third track segment form at least a portion of a second position track.

In at least one embodiment, the toy further comprises wherein, when the first-half and the second-half are in the first position, the first-half first track segment and the second-half first track segment form a first position first continuous loop track; wherein, when the first-half and the second-half are in the first position, the first-half second track segment and the second-half second track segment form a first position second continuous loop track; wherein, when the first-half and the second-half are in the first position, the first-half third track segment and the second-half third track segment form a first position third continuous loop track; wherein, when the first-half and the second-half are in the second position, the first-half first track segment, the second-half first track segment, the first-half second track segment, the second-half second track segment, the first-half third track segment and the second-half third track segment form second position continuous loop track.

A method of operating a pet toy, the method comprising obtaining a sphere having a spherical first-half and a spherical second-half, wherein the first-half and the second-half are rotatable relative to one another from a first position to a second position; wherein the first-half comprises a plurality of first-half track segments, wherein the plurality of first-half track segments are all undercut track segments; wherein the second-half comprises a plurality of second-half track segments, wherein the plurality of second-half track segments are all undercut track segments; arranging the first-half and the second-half of the toy in the first position, wherein, when the first-half and the second-half are in the first position, at least one first position track includes at least one first-half track segment of the plurality of first-half track segments and at least one second-half track segment of the plurality of second-half track segments; rotating at least one of the first-half and the second-half of the toy relative to one another and to the second position, wherein, when the first-half and the second-half are in the second position, at least one second position track includes at least one first-half track segment of the plurality of first-half track segments and at least one second-half track segment of the plurality of second-half track segments, wherein the at least one first position track and the at least one second position track are at least partially different tracks.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
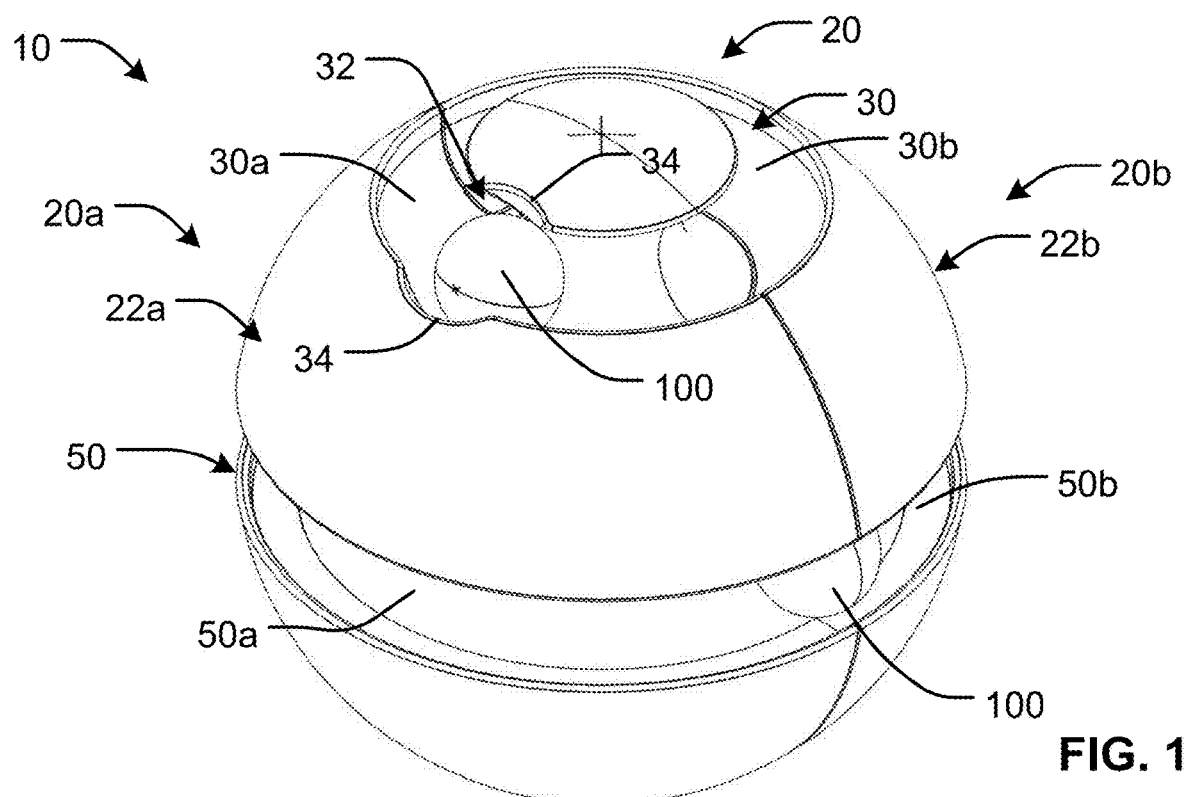
FIG. 1 is a three-dimensional view of a toy according to the present disclosure in a first position.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Figure 2:
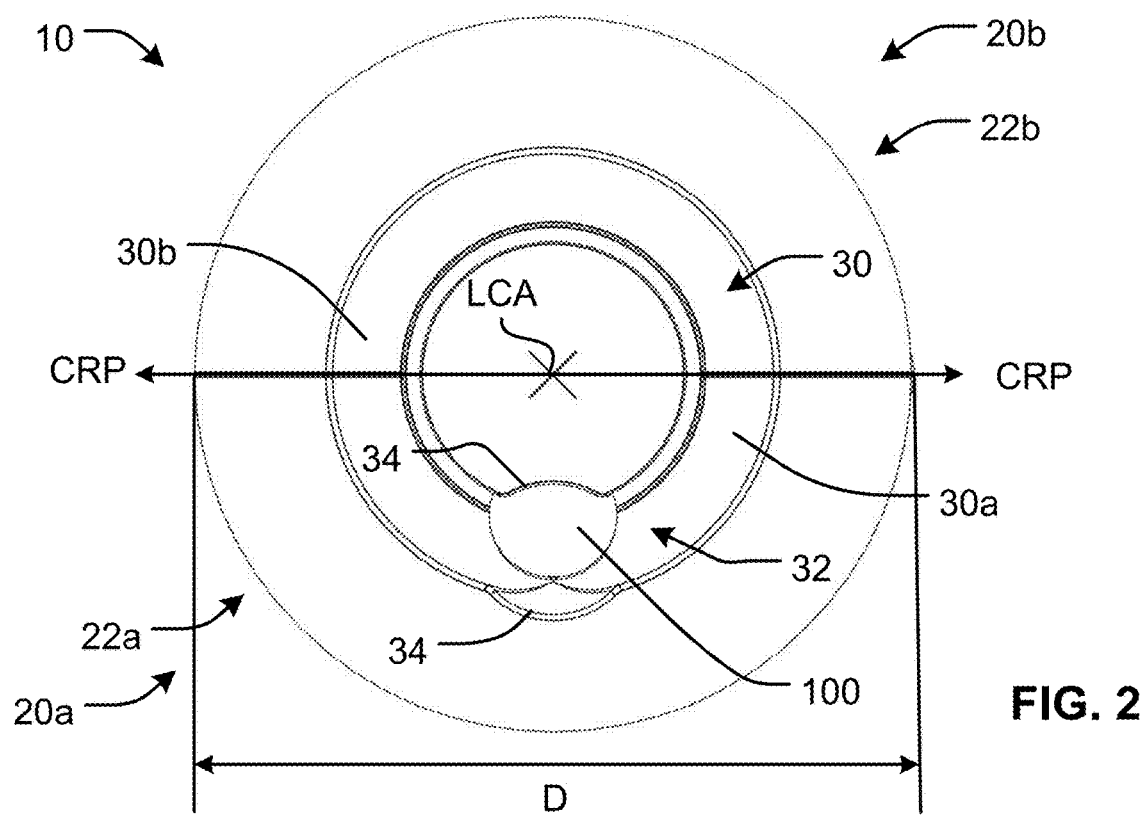
FIG. 2 is a top view of the toy of FIG. 1.
Figure 3:
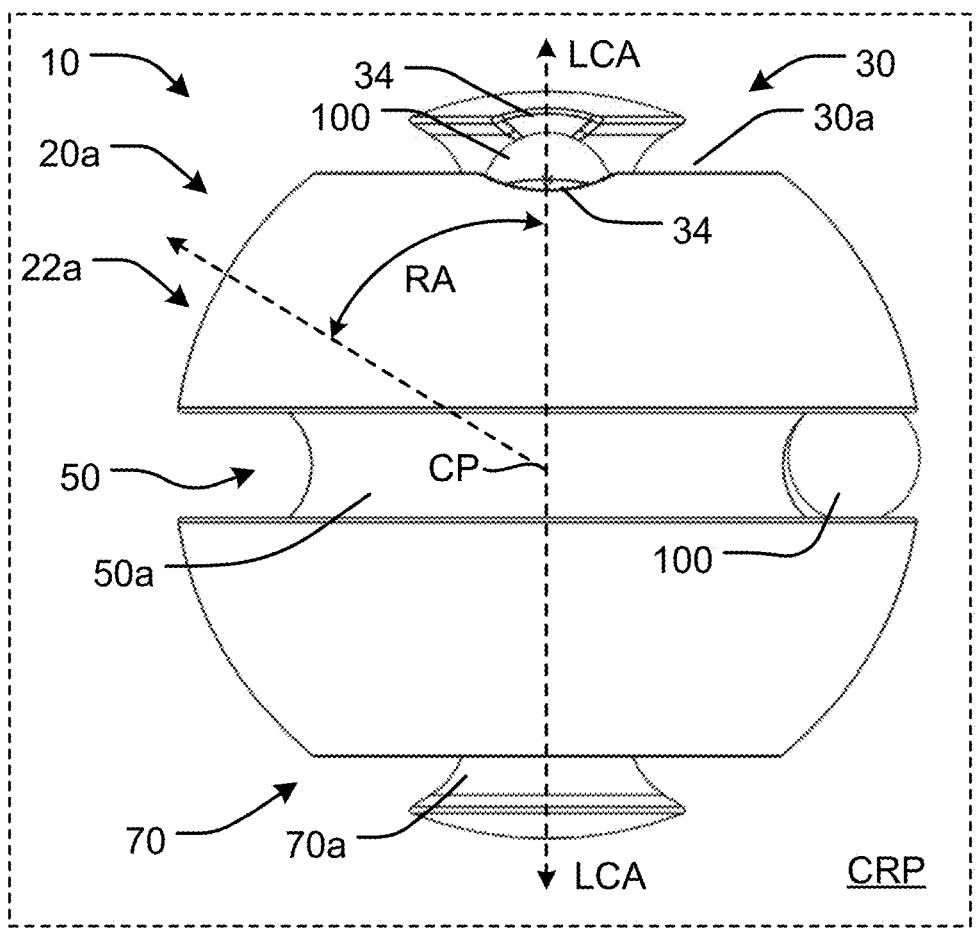
FIG. 3 is another side view of the toy of FIG. 1.

Referring to FIGS. 1-3, there is shown a toy 10, which may be further referred to a changeable maze toy and/or a treat dispenser toy. As will be explained more fully herein, the toy 10 may be particularly played with and otherwise used by a pet (e.g. dog), however, such use should not be understood to be necessarily limiting, as other uses as disclosed are contemplated.

As shown, toy 10 comprises a sphere 20. Sphere 20 may have an outside (maximum) diameter D in a range of 2 inches to 12 inches, and more particular 3 inches to 7 inches. As shown, sphere 20 has two spherical halves 20a, 20b, which may be further understood as hemi-spherical halves or 180 degree halves. As shown, the spherical halves 20a, 20b each have a respective (hemi) spherical half outer face 22a, 22b, with the outer faces 22a, 22b being arranged facing in opposite directions away from each other.

As explained in greater detail below, the spherical halves 20a, 20b, are rotatable with respect to one another on opposite sides of a center rotation plane CRP, which extends parallel with the longitudinal center axis LCA of the toy 10. As shown in FIGS. 1-3, spherical halves 20a, 20b are in a first position of toy 10.

By way of example, FIG. 3 shows an exemplary rotation angle RA which may be provided by the toy 10, with the rotation angle RA disposed on the center rotation plane CRP, with the vertex of the rotation angle RA occurring on the longitudinal center axis LCA at the center point CP of the toy 10.

Figure 4:
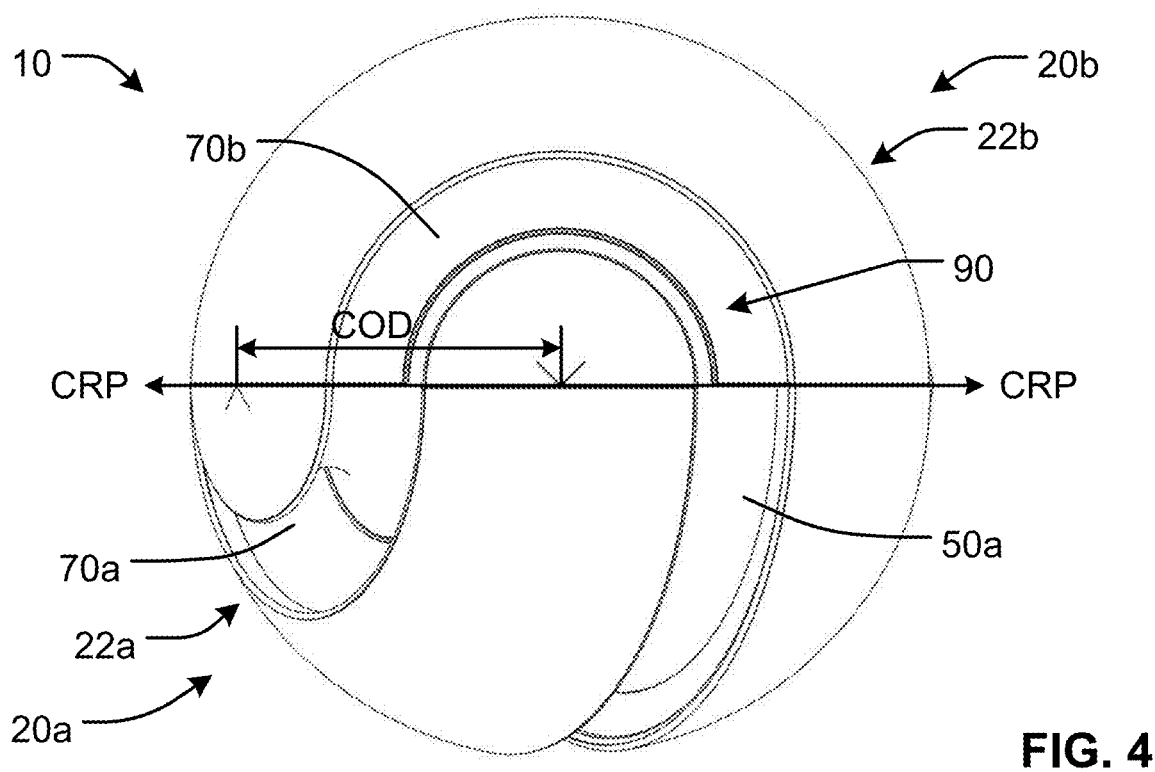
FIG. 4 is a side view of the toy in FIG. 1 in a second position.
Figure 5:
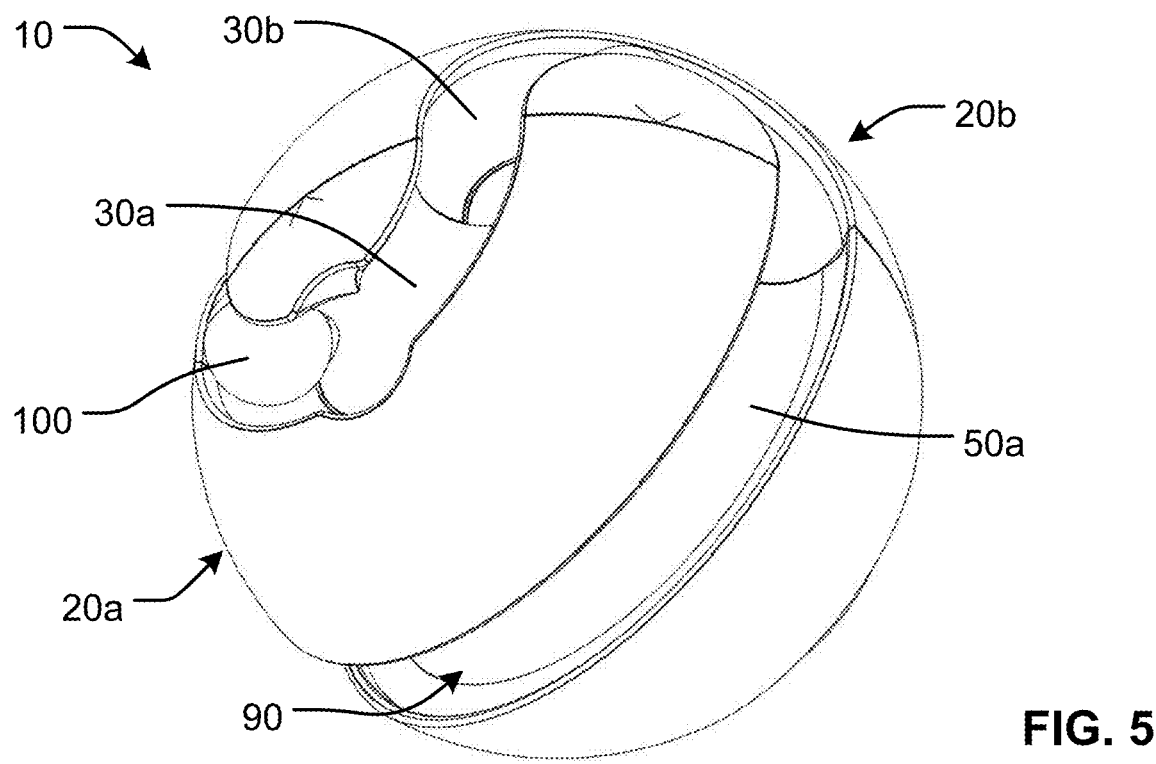
FIG. 5 is a three-dimensional view of the toy in FIG. 4.
Figure 6:
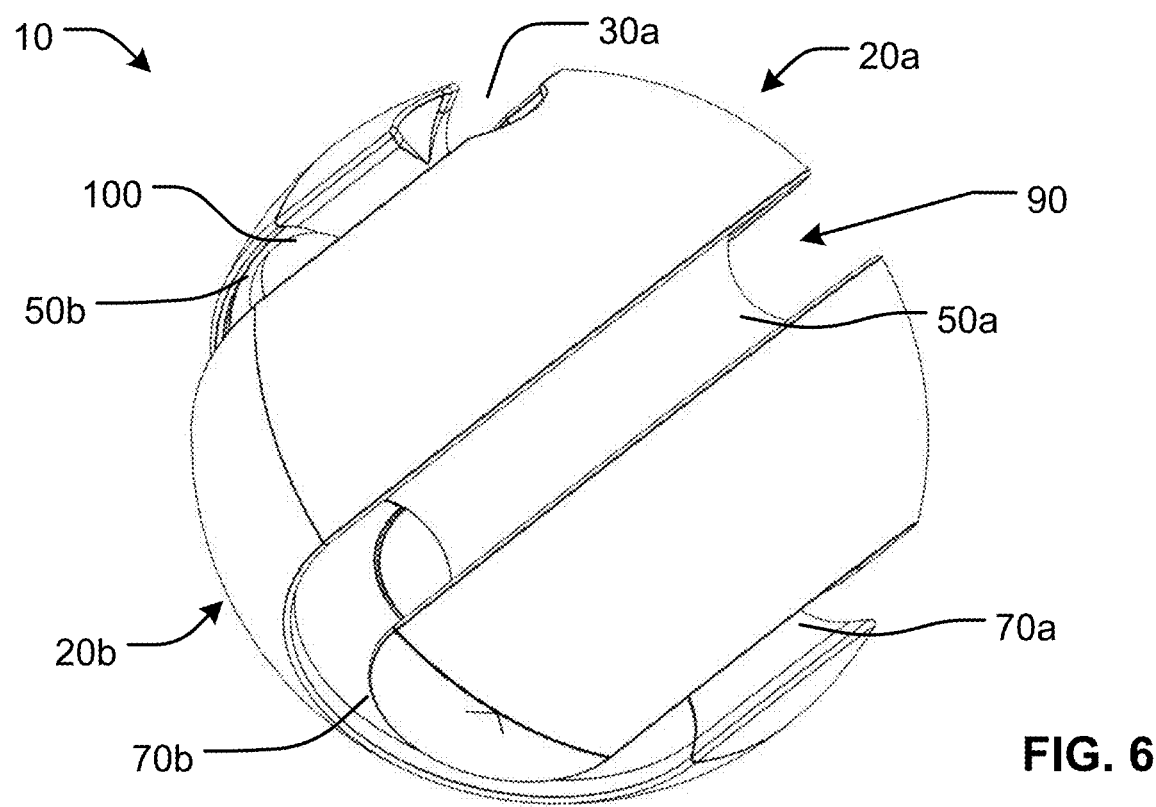
FIG. 6 is another three-dimensional view of the toy in FIG. 4.
Figure 7:
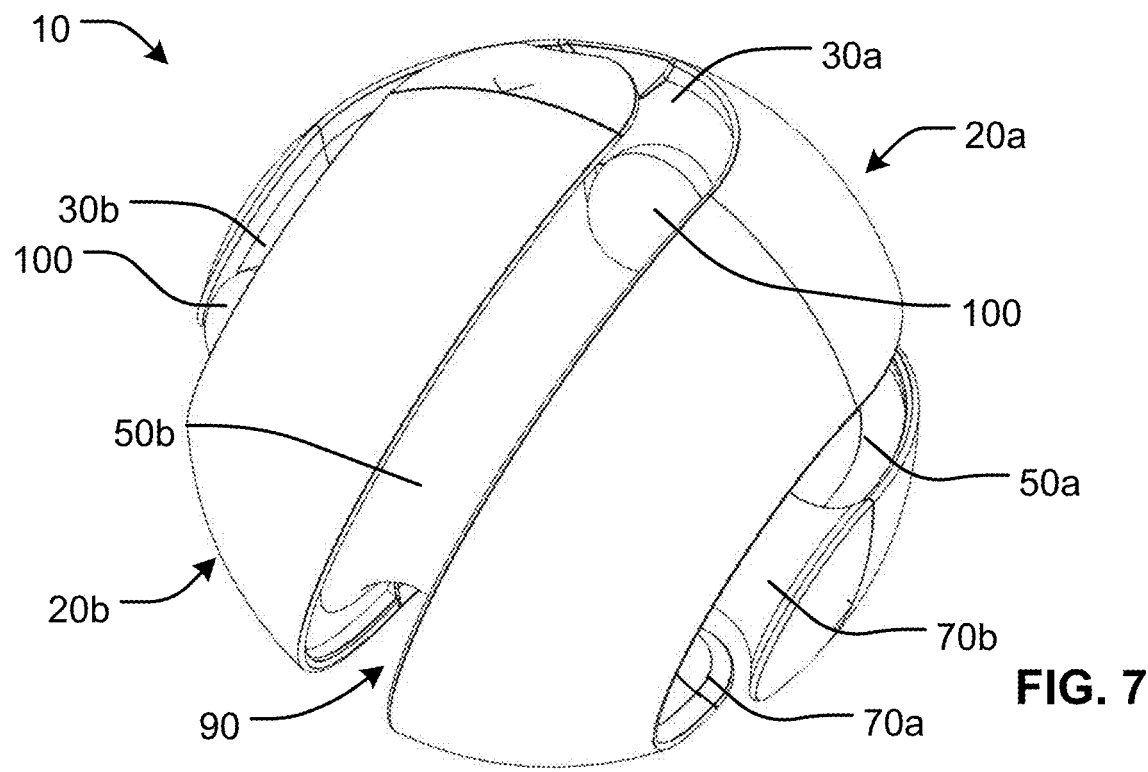
FIG. 7 is another three-dimensional view of the toy in FIG. 4.
Figure 8:
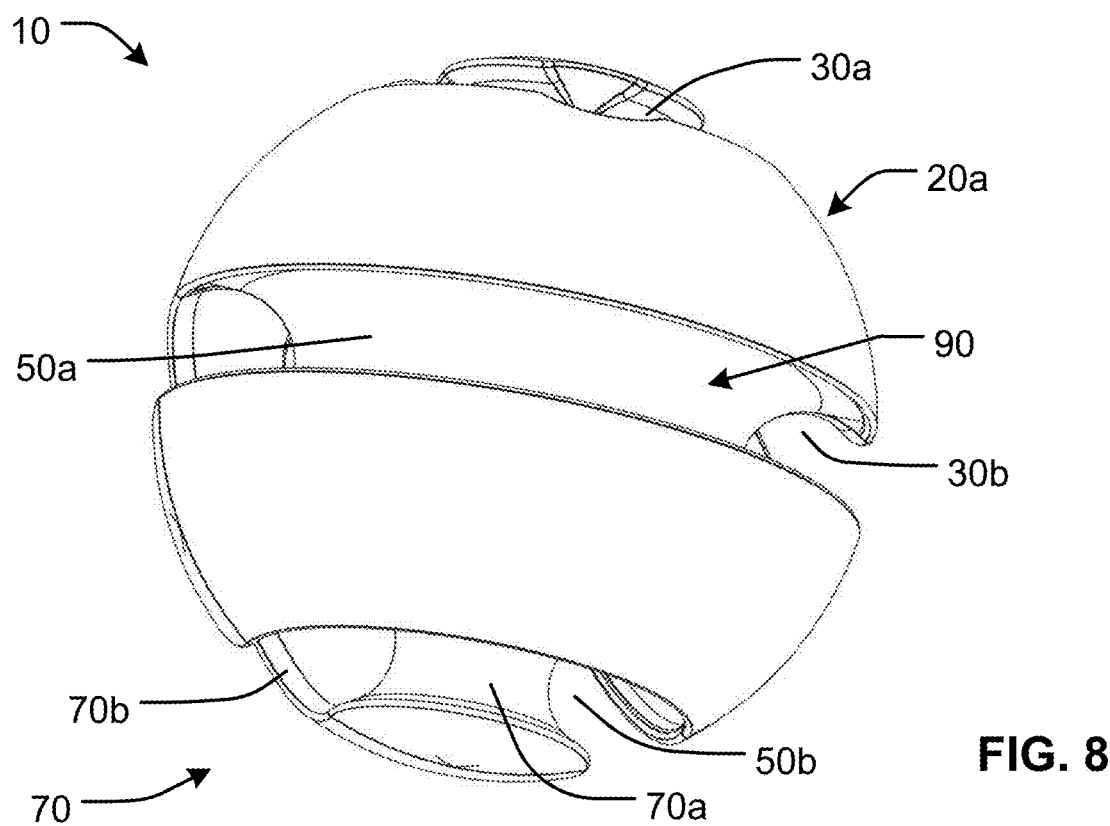
FIG. 8 is another three-dimensional view of the toy in FIG. 4.

As shown in FIG. 4, when the spherical half 20a is rotated to the rotation angle RA relative to spherical half 20b, the spherical half 20a is thereafter offset relative to the spherical half 20b at a circumferential offset distance COD. In FIG. 4, spherical halves 20a, 20b are in a second position of toy 10, with the rotational angle RA being 45 degrees.

Returning to FIGS. 1-3, when in the first position, the outer face 22a, 22b of toy 10 has a plurality of continuous (open) loop tracks 30, 50 and 70, which are more particularly each shown as circular loop tracks, each having a uniform (radial) distance from the longitudinal center axis LCA for the 360 degrees around the longitudinal center axis LCA of the toy 10. As used herein, an "open" loop track should be understood as a track which is not fully enclosed along is length, but only partially enclosed.

As shown, in the first position, the continuous loop tracks 30, 50 and 70 are spatially isolated from one another (i.e., do not cross/intersect) and have no dead (terminal) end sections. Loop tracks 30 and 70 are disposed at equal distances from the opposite longitudinal ends of the toy 10, whereby tracks 30 and 70 have the same uniform (radial) distance from the longitudinal center axis LCA for the 360 degrees around the longitudinal center axis LCA of the toy 10. Loop track 50 is disposed midway between the loop tracks 30 and 70 relative to the longitudinal center axis LCA, and more particularly at the center of the toy 10 relative to the longitudinal center axis LCA. As such, loop track 50 has a greater (radial) distance to the longitudinal center axis LCA than loop tracks 30 and 70.

As shown, first continuous loop track 30 is formed by coupled (aligned) semi-circular half loop (180 degree) track segments 30a, 30b which extend around the longitudinal center axis LCA of the toy 10. Similarly, second continuous loop track 50 is formed by coupled (aligned) semi-circular half loop (180 degree) track segments 50a, 50b which extend around the longitudinal center axis LCA of the toy 10, and third continuous loop track 70 is formed by coupled (aligned) semi-circular half loop (180 degree) track segments 70a, 70b which extend around the longitudinal center axis LCA of the toy 10. As shown, best by FIG. 9, each of the track segments 30a, 30b, 50a, 50b, 70a, 70b have two terminal ends at opposing ends of the segment, which ends are adjacent the center rotation plane CRP and disposed on a same side of the center rotation plane CRP.

Referring now to FIGS. 4-8, spherical halves 20a, 20b are in a second position of toy 10, with the rotational angle RA of 45 degrees. As shown, all three continuous loop tracks 30, 50 and 70 are no longer isolated and now intersect to form a further continuous loop track 90, which is partially different from each of the prior loop tracks 30, 50, 70. More particularly, loop track 90 is formed by all of prior loop tracks 30, 50 and 70 into a longer, more tortuous, loop track 90, i.e. all of track segments 30a, 30b, 50a, 50b, 70a and 70b.

Loop tracks 30, 50 and 70, and hence also loop track 90, are configured to provide a guide track to guide a track roller member 100 therein. Roller member 100 may be in the form of a sphere and may be edible and digestible, which may be, for example formed of kibble (i.e. pet food containing meat(s), grain(s) and/or vegetable(s) that is reshaped and dried (hardened) into individual pieces). Roller member 100 may have a diameter in a range of 0.25 inches to 1.5 inches, and more particularly 0.4 inches to 1.1 inches. As such, loop tracks 30, 50, 70, and 90, and hence track segments 30a, 30b, 50a, 50b, 70a and 70b may have a diameter of 0.05 inch to 0.10 inch larger than the diameter of the roller member 100 to facilitate rolling movement in the track.

As shown, the loop tracks 30, 50, 70, 90 are all undercut loop tracks (hence track segments 30a, 30b, 50a, 50b, 70a and 70b are also all undercut) having the same semi-circular undercut profile along their respective lengths, except at a combination inlet/outlet 32 in loop tracks 30 and 90 for the roller member 100 to be inserted into and removed from the loop tracks 30 and 90. As shown, inlet/outlet 32 comprises two opposing semi-circular recesses 34, which are aligned with one another on opposing sides of the tracks 30 and 90.

As such, it should be understood from the figures that two loop tracks 50 and 70 have a constant cross-sectional (undercut) profile along their entire lengths, while loop tracks 30 and 90 has a same constant cross-section (undercut) profile along their entire lengths except at the roller member inlet/outlet 32. Moreover, it should be understood that, when disposed in loop tracks 30, 50, 70 and 90, the cross-sectional profile of the spherical roller member 100 occupies the undercut region of the loop tracks 30, 50, 70 and 90, and hence may not be inserted or removed from toy 10 except at inlet/outlet 32. Stated another way, the opening to the loop tracks 30, 50, 70, 90 formed in the outer face 22a, 22b of toy 10 is size smaller than the cross-sectional diameter of the spherical roller member 100 such that the spherical roller member 100 may not be inserted or removed from toy 10 except at inlet/outlet 32.

As such, loop tracks 30, 50, 70, 90 are configured such that, when a roller member 100 is disposed in the loop tracks 30, 50, 70, 90, the loop tracks 30, 50, 70, 90 physically inhibits (interferes with) the roller member 100 from exiting the loop track 30, 50, 70, 90 except at inlet/outlet 32;

During use of the toy 10, one or more spherical roller members 100 may be inserted through one or more inlet(s)/outlet(s) 32 into the tracks 30, 50, 70 when toy 10 is in the first position, or into track 90, when toy 10 is in the second position.

As may be appreciated, when toy 10 is in the second position (i.e. with loop 90 formed, see FIGS. 4-8), a roller member 100 may be inserted through combined inlet/outlet 32 and into track segment 30a of track 90, particularly when such is disposed at the vertical top of the toy 10. The spherical roller member 100 may then roll downwards to track segment 70a of track 90, or to any location therebetween. Thereafter, toy 10 may be placed on a planar surface, at which time a pet may push the toy 10 with their paw or head (e.g. nose or mouth), grasp and drop the toy 10 or otherwise, causing the toy 10 to roll on the planar surface. As the toy 10 rolls on the planar surface, the toy 10 may invert such that track segment 70a of track 90 moves to the top of the toy 10, are otherwise at a vertical position superior (i.e. higher) to track segment 30a. With the change in orientation of the toy 10, and more particularly the track 90, when track segment 70a is disposed vertically higher than track segment 30a, gravity may cause the spherical roller member 100 to roll from track segment 70a back to track segment 30a and out of the toy 10 through combined inlet/outlet 32. At such time, the spherical roller member 100 may be consumed by the pet.

As may be appreciated, roller members 100 may also be stored in the toy 10, for consumption by the pet at a later time, without fear that the roller members 100 will exit the track through combined inlet/outlet 32. By way of example, when toy 10 is in the second position (i.e. with loop 90 formed, see FIGS. 4-8), a roller member 100 may be inserted through combined inlet/outlet 32 and into track segment 30a of track 90, particularly when such is disposed at the vertical top of the toy 10. The roller member 100 may then roll downwards to one or more of track segments 50a, 50b, 70a, 70b of track 90. Once disposed in track segments 50a, 50b, 70a, 70b of track 90, the toy 10 may be thereafter arranged in the first position, with track loops 30, 50 and 70 separated and not interconnected (see FIGS. 1-3), As such, because track loops 50 and 70 do not include inlet/outlet 32, the roller members 100 disposed at track segments 50a, 50b, 70a, 70b will remain in track loops 50 and 70, with being able to exit the tracks 30 and 70. Thereafter, when the pet is permitted to use toy 10, the toy 10 is disposed in the second position (i.e. with loop 90 formed, see FIGS. 4-8) and the roller members 100 previously retained in track loops 50 and 70 are now able to exit the combined inlet/outlet 32 of newly formed track loop 90, which includes track segment 30a having the combined inlet/outlet 32.

Figure 9:
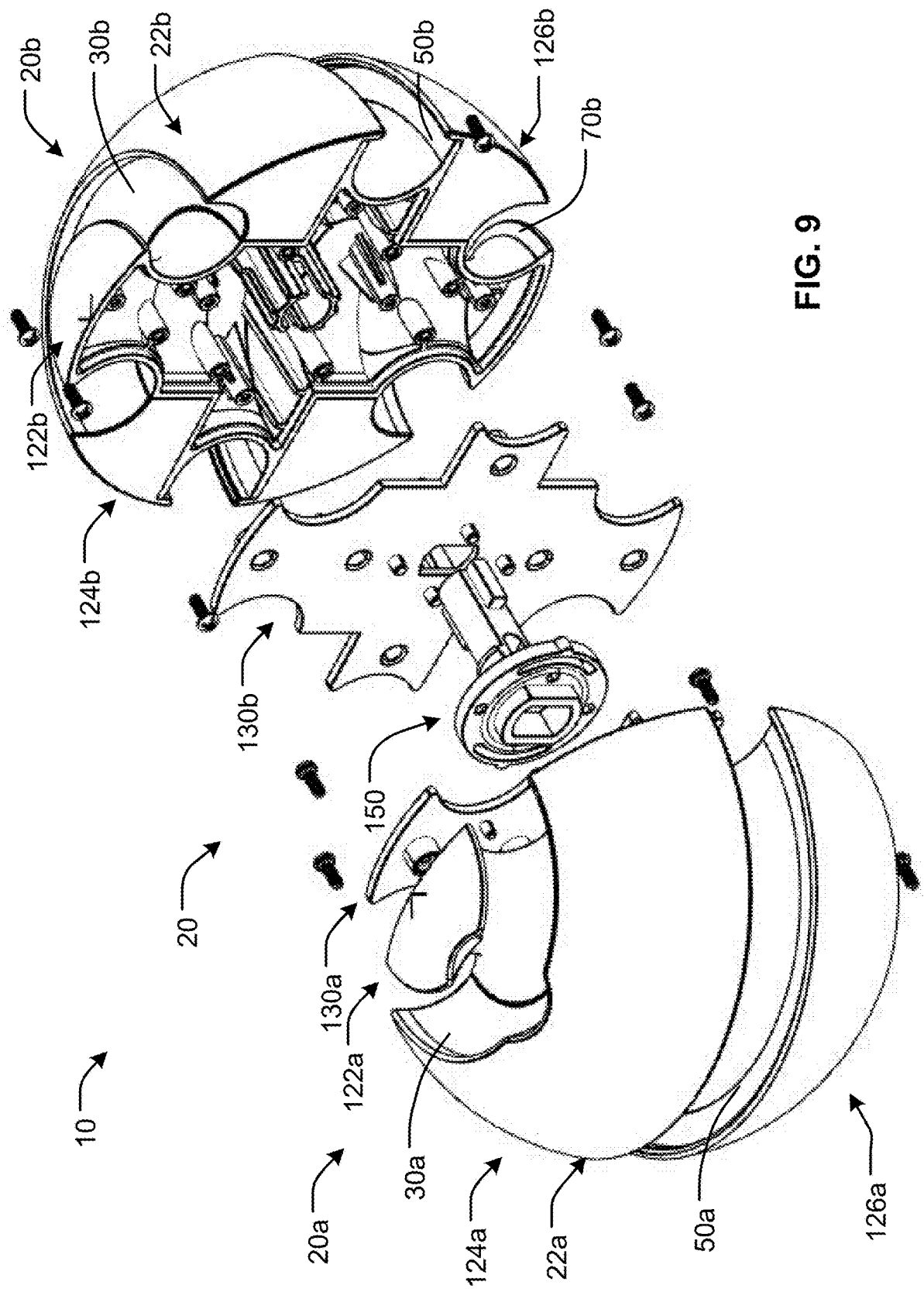
FIG. 9 is an exploded three-dimensional view of the toy of FIG. 1.
Figure 10:
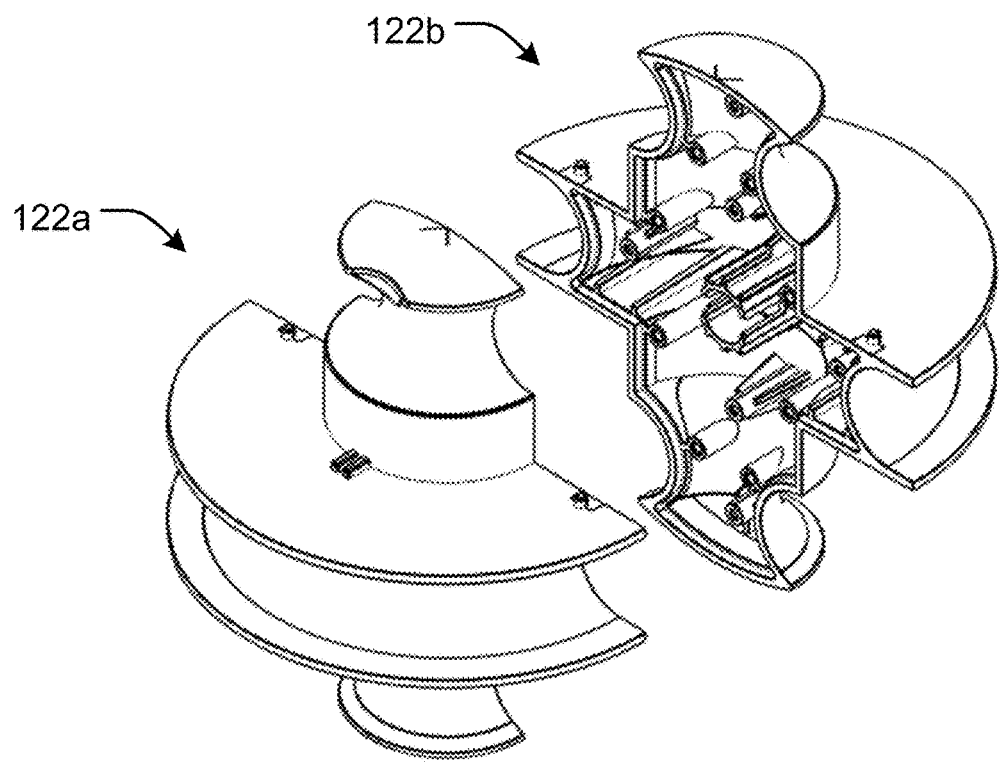
FIG. 10 is an exploded three-dimensional view of inner body members of the toy of FIG. 1.
Figure 11:
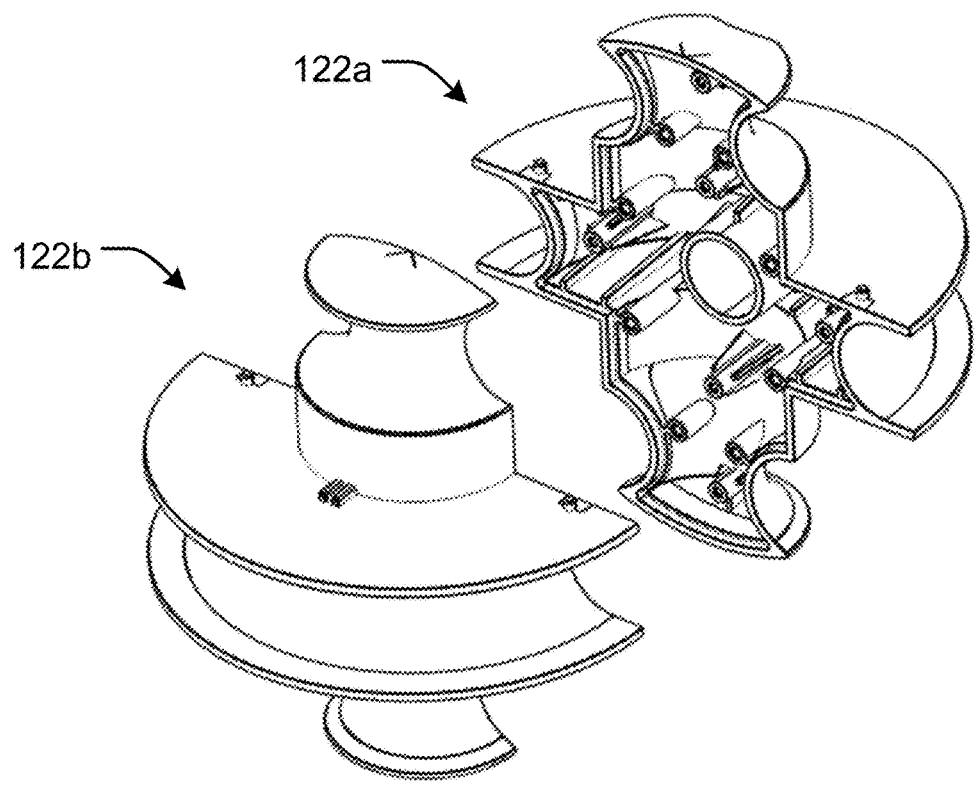
FIG. 11 is another exploded three-dimensional view of the inner body members of the toy of FIG. 1.
Figure 12:
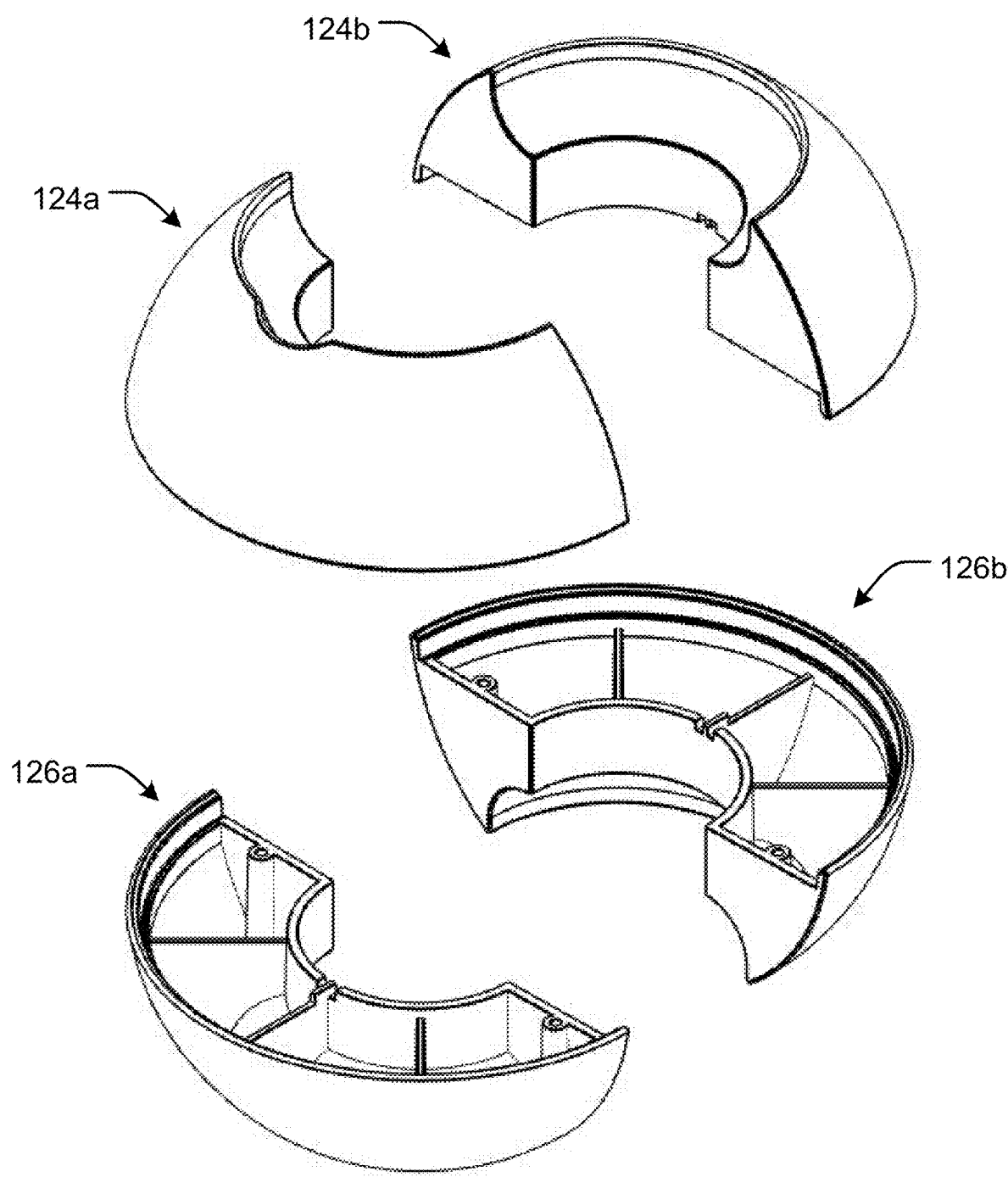
FIG. 12 is an exploded three-dimensional view of outer body members of the toy of FIG. 1.

Referring now to FIG. 9, there is shown a partially exploded view of toy 10. As shown, spherical half 20a of toy 10 comprises two outer body members 124a, 126a disposed over an inner body member 122a. Similarly, spherical half 20b of toy 10 comprises two outer body members 124b, 126b disposed over and assembled with an inner body member 122b. Further views of the inner body members 122a, 122b are provided in FIGS. 10-11, while further views of the outer body members 124a, 126a, 124b, 126b as shown in FIG. 12.

As shown by FIG. 9, each spherical half 20a, 20b of toy 10 comprises a support (back) plate 130a, 130b which is fastened to the respective inner body members 122a, 122b, particularly mechanically fastened by threaded fasteners. Outer body members 124a, 126a may be fastened to inner body member 122a particularly by welding, such as ultrasonic welding, or adhesive bonding. Similarly, outer body members 124b, 126b may be fastened to inner body member 122b particularly by welding, such as ultrasonic welding, or adhesive bonding.

Figure 13:
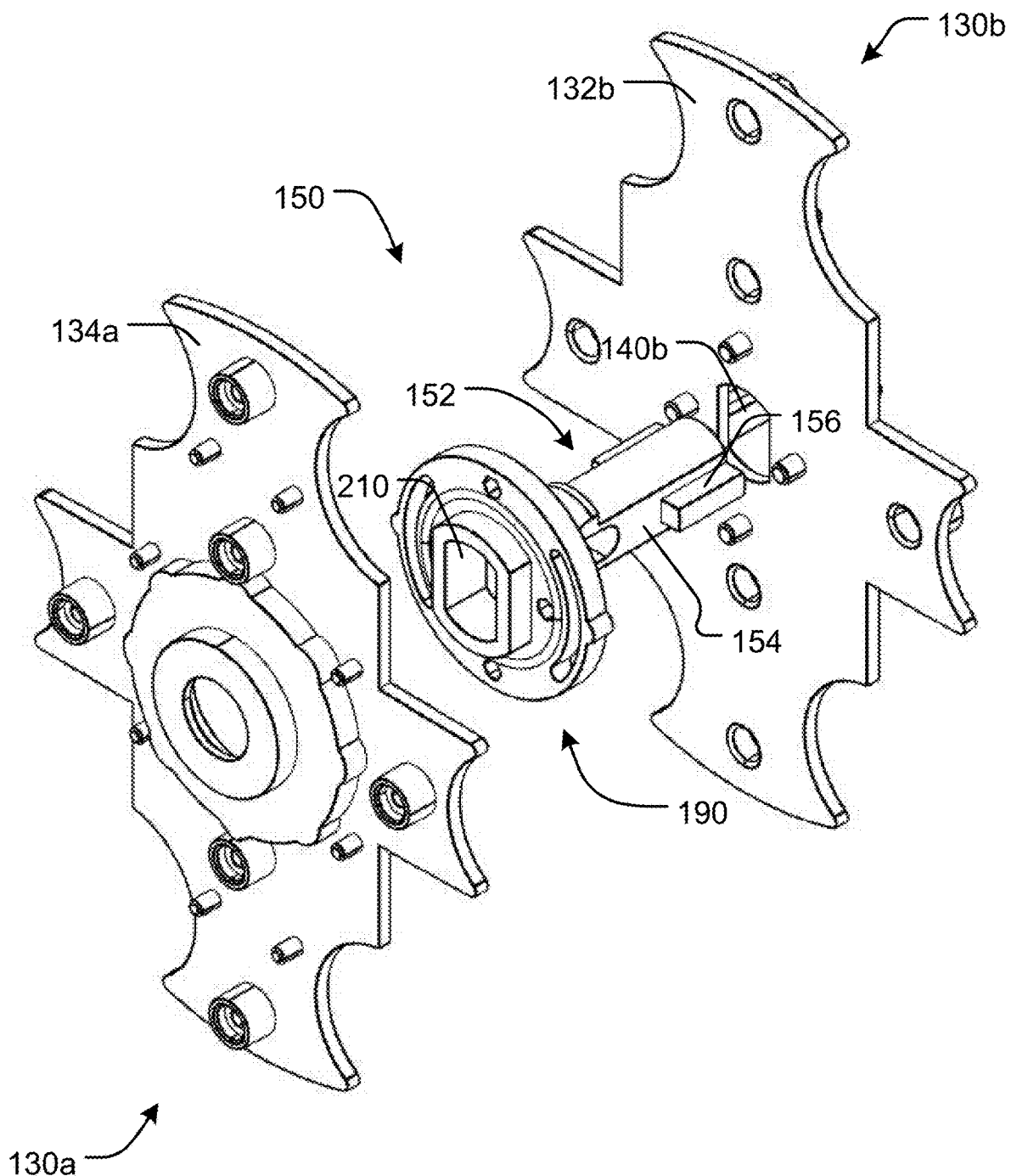
FIG. 13 is an exploded three-dimensional view of support (back) plates and a hub of the toy of FIG. 1.
Figure 14:
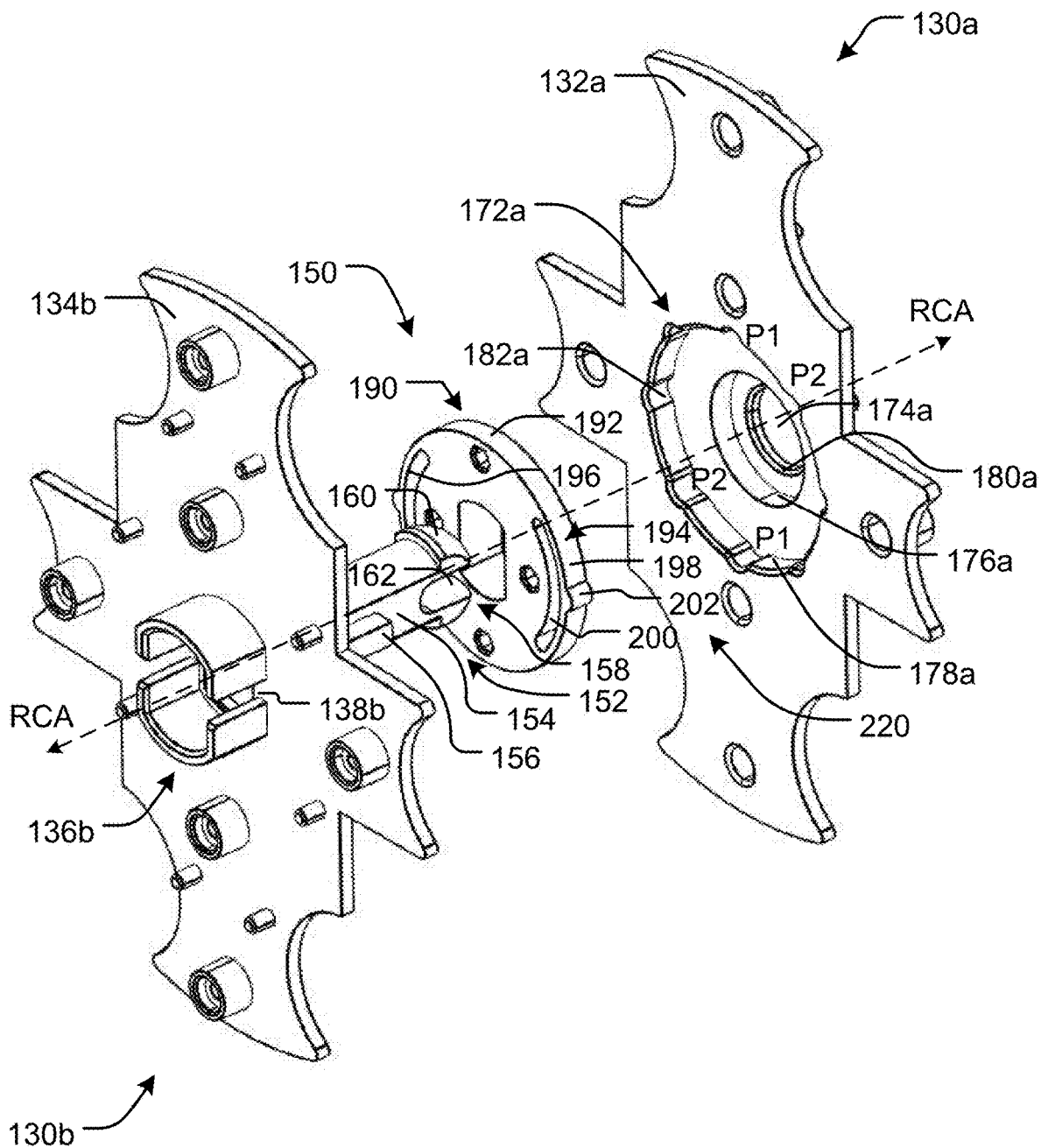
FIG. 14 is another exploded three-dimensional view of the support (back) plates and the hub of the toy of FIG. 1.

As best shown by FIGS. 13-14, each support plate 130a, 130b has an inner face 132a, 132b and an outer face 134a, 134b opposite the inner face 132a, 132b, respectively. As shown, the inner faces 132a, 132b face one another. The spherical halves 20a, 20b are mechanically fastened on a hub 150, which couples with both support plates 130a, 130b to connect the spherical halves 20a, 20b together and permit rotation of the spherical halves 20a, 20b relative to one another.

As shown in FIGS. 13-14, hub 150 comprises a shaft 152 and a disc 190. As shown, shaft 152 may be understood to have an oblong, semi-cylindrical, cross-sectional profile, and more particularly a double D (or DD) cross-sectional profile formed by two parallel flats 154 extending along a longitudinal length of the shaft 152 that are on opposite sides of the profile of the shaft 152, i.e. 180 degrees from one another. At one end portion, the profile of shaft 152 further comprises two retainer members 156, in the form of rectangular protruding tabs, disposed on the flats 154, respectively.

The shaft 152 mates with a shaft anti-rotation receptacle 136b, including retainer member (tab) receptacles 138b, on the outer face 134b of support plate 130b, to inhibit rotation of the shaft 152 relative to the support plate 130b and vice versa. Stated another way, when mated, the shaft 152 and the shaft receptacle 136b have mating cross-sectional profiles which inhibit the shaft 152 and the shaft receptacle 136b from rotating relative to one another.

As shown, support plate 130b also comprises an anti-rotation through-hole 140b through which a portion of the shaft 152 extends when the toy 10 is assembled, but may not rotate relative to the support plate 130b. As shown, the through-hole 140b is sized such that the retainer members/tabs 156 make contact with the outer face 134b of the support plate 130b, which creates an interference which inhibits the retainer members/tabs 156 from passing through the through-hole 140b, when shaft 152 is passed through-hole 140b from outer face 134b to inner face 132b of support plate 130b, to retain the assembly together.

The oppose end of shaft 152 includes an enlarged elastically deformable head 158 comprising two elastically deformable retainer members 160, in the form retainer hooks, disposed on opposite sides of the head 158 and spaced apart by a U-shaped recess (groove) 162 in the head 158. As shown, the retainer members/tabs 156 and the retainer hooks 160 are disposed offset from one another around a rotational center axis RCA of the hub 150, particularly not occupying the same circumferential space around the rotational center axis RCA of the hub 150.

With regards to disc 190, the outer circular (cylindrical) circumference 192 includes a plurality of elastically deformable, elongated spring legs 194 extending circumferentially around an outer circumference 192 of the disc 190. As shown, the outer (circumferential) side 198 of the legs 194 is defined by the outer circumference 192 of the disc 190, while an inner (circumferential) side 196 of the legs 194 is defined by a circumferentially extending elongated relief 200, which extends through the complete thickness of disc 190 as a through-hole. As described and shown, disc 190 may be understood as providing a planar spring, which flexes in the radial direction.

The legs 194 each having a width equal the thickness of the disc 190, and a circumferential length in a range 60 to 120 degrees around a longitudinal axis of the shaft 152. The outer side 198 of each leg 194 further includes a radially outwardly directed semi-circular (semi-cylindrical) protrusion 202, disposed at the middle of the circumferential length of the legs 194, the operation of which is described below.

Similar to support plate 130b, the center of the disc 190 includes a shaft anti-rotation receptacle 210, in the form of a through-hole, through which a portion of the shaft 152 extends when the toy 10 is assembled, but which inhibits rotation of the shaft 152 relative to the disc 190 and vice-versa. Stated another way, when mated, the shaft 152 and the shaft receptacle 210 have cross-sectional profiles which inhibit the shaft 152 and the shaft receptacle 210 from rotating relative to one another.

Turning to support plate 130a, support plate 130a comprises a recess 172a having a through-hole 174a, an outer counterbore 176a and an inner counterbore 178a. As shown, the base/floor of outer counterbore 176a form an annular ring 180a. As shown, inner counterbore 178a includes a plurality of protrusion detents 182a equally spaced circumferentially around rotational center axis RCA, particularly shown 45 degrees apart from one another, particularly to receive and releasably engage and retain protrusions 202 therein.

When assembled, disc 190 occupies recess 172a and, more particularly inner counterbore 178a and outer counterbore 176a. Shaft 152 extends through shaft receptacle 136b of support plate 130b, shaft receptacle 210 of disc 190; and outer counterbore 176a, inner counterbore 178a and through-hole 174a of support plate 130a.

Figure 16:
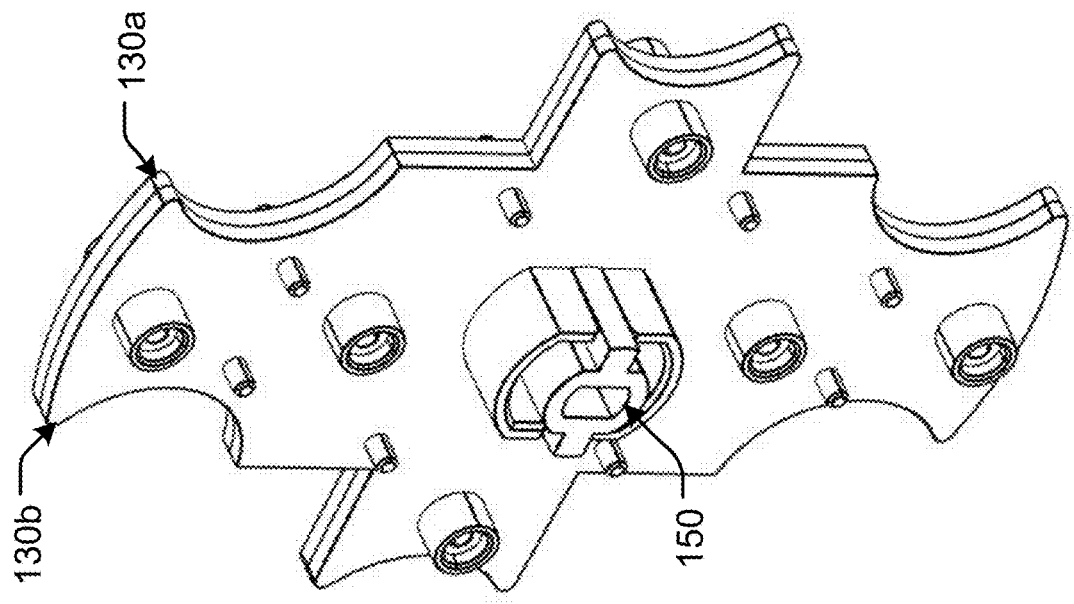
FIG. 16 is another assembled three-dimensional view of the support (back) plates and the hub of the toy of FIG. 1.
Figure 15:
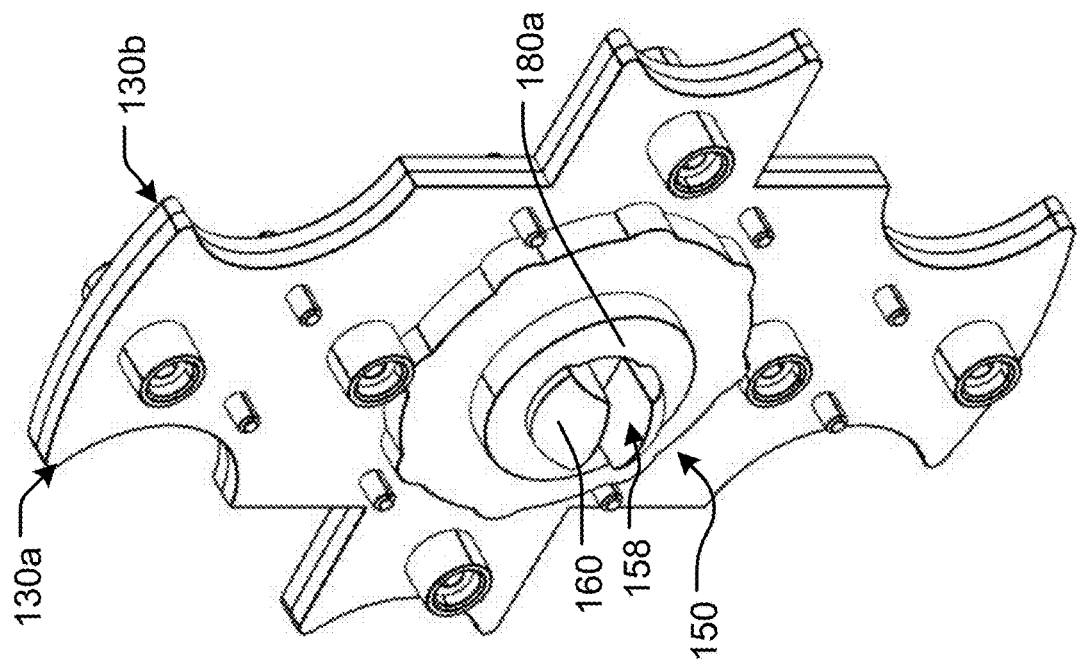
FIG. 15 is an assembled three-dimensional view of the support (back) plates and the hub of the toy of FIG. 1.

As shown by FIGS. 15-16, when assembled, the head 158 of the shaft 152 extends through through-hole 174a of support plate 130a, such that the annular ring 180a is retained by retainer members 160 of the shaft 152. More particularly, retainer members/tabs 156 and 160 of the shaft 152 retain support plate 130b, disc 190 and support plate 130a together along the rotational center axis RCA of the hub 150.

During assembly of spherical halves 20a, 20b, as retainer members 160 of head 158 pass through through-hole 174a of support plate 130a, such makes interference contact with the annular ring 180a, causing the retainer members 160 to elastically deform inwards towards each other and the rotational center axis RCE of the hub 150. Thereafter, once the retainer members 160 pass through the through-hole 174a of support plate 130a, the retainer members 160 elastically return outwards away from each other and the rotational center axis RCA of the hub 150 to retain the support plate 130b, the disc 190 and the support plate 130a together between the retainer members/tabs 156 and 160 of the shaft 152.

Once the toy 10 is assembled, spherical halves 20a, 20b may be in the first position of toy 10 as shown in FIGS. 1-3. Thereafter, spherical half 20a and/or spherical half 20b may be rotated relative to one another, around the rotational center axis RCA of hub 150 to the second position shown in FIGS. 4-8.

Returning to FIG. 14, when toy 10 is in the first position, protrusions 202 of the hub 150 may occupy detents 182a at positions P1. Thereafter, when spherical half 20a and/or spherical half 20b is rotated relative to one another, around the rotational center axis RCA of hub 150 to the second position, protrusions 202 of the hub 150 may occupy detents 182a at positions P2. When the protrusions 202 are disposed in the protrusion detents 132a, spherical half 20a and/or spherical half 20b are held releasably fixed relative to one another until a rotational force is applied around the rotational center axis RCA of hub 150 with enough force to disengage the protrusions 202 from the protrusion detents 132a. When disengaged, the elastically deformable spring legs 194 deform inwards towards the rotational center axis RCA of hub 150 to allow rotation of spherical half 20a and/or spherical half 20b relative to one another. Once the protrusions 202 are reengaged in another set of the protrusion detents 182a, the elastically deformable spring legs 194 elastically recover outwards away from the rotational center axis RCA of hub 150 to their initial shape to retain the halves 20a, 29b an fixed releasable position relative to one another. In such regards, at least the spring legs 194, relief 200, protrusions 202 and protrusion detents 182a may be understood to be part of a releasable detent mechanism 220.

The outer body members 124a, 124b, 126a, 126b; the inner body members 122a, 122b; the support plates 130, 130b; the shaft 152 and the disc 190 may all be formed of an injection molded (rigid) thermoplastic such as polyamide (nylon), polyacetal, polyolefin (e.g. polypropylene). Alternatively, the shaft 152 and the disc 190 may be formed of (diecast) metal.

While the foregoing toy 10 has been described as having particular use as a pet treat dispenser toy for pets, particularly when the roller member 100 is an edible pet treat, the toy 10 may also be used as a changeable maze toy for use by human, in which case the roller member 100 may be a non-edible sphere, and may be formed, for example, of plastic, glass (e.g. marbles), metal (e.g. bearings).

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

LISTING OF REFERENCE CHARACTERS 10 toy
20 sphere
20a spherical half
20b spherical half
22a outer face
22b outer face
30 loop track
30a loop track segment
30b loop track segment
32 inlet/outlet 34 recess
50 loop track
50a loop track segment
50b loop track segment
70 loop track
70a loop track segment
70b loop track segment
90 loop track
100 roller member
122a inner body member
122b inner body member
124a outer body member
124b outer body member
126a outer body member
126b outer body member
130a support (back) plate
130b support (back) plate
132a inner face
132b inner face
134a outer face
134b outer face
136b shaft receptacle
138b shaft retainer member (tab) receptacle
140b through-hole
150 hub
152 shaft
154 flats
156 retainer member/tab
158 head
160 retainer member
162 recess
172a recess
174a through-hole
176a outer counterbore
178a inner counterbore
180a annular ring
182a protrusion detents
190 disc
192 outer circumference
194 spring leg
196 inner side
198 outer side
200 relief
202 protrusion
210 shaft receptacle
220 detent mechanism
CP center point
COD circumferential offset distance
CRP center rotation plane
D diameter
LCA longitudinal center axis
RA rotation angle
RCA rotational center axis

What is claimed is:

1. A pet treat dispenser toy, comprising:
a sphere having a spherical first-half and a spherical second-half;
wherein the first-half and the second-half are rotatable relative to one another from a first position of the pet treat dispenser toy to a second position of the pet treat dispenser toy;
wherein the first-half comprises a plurality of first-half track segments, wherein the plurality of first-half track segments are all undercut track segments;
wherein the second-half comprises a plurality of second-half track segments, wherein the plurality of second-half track segments are all undercut track segments;
wherein, when the first-half and the second-half are in the first position of the pet treat dispenser toy, at least one first position track includes at least one first-half track segment of the plurality of first-half track segments and at least one second-half track segment of the plurality of second-half track segments;
wherein, when the first-half and the second-half are in the second position of the pet treat dispenser toy, at least one second position track includes at least one first-half track segment of the plurality of first-half track segments and at least one second-half track segment of the plurality of second-half track segments;
wherein the at least one first position track and the at least one second position track are at least partially different tracks;
at least one roller member rollable within the at least one first position track and the at least one second position track;
one or more combination inlet(s)/outlet(s) to insert the at least one roller member into, and remove the at least one roller member from, respectively, the at least one first position track and the at least one second position track;
wherein, the at least one first position track is configured such that, when the at least one roller member is disposed in the at least one first position track, the at least one first position track physically inhibits the at least one roller member from exiting the at least one first position track except through the one or more combination inlet(s)/outlet(s);
wherein, the at least one second position track is configured such that, when the at least one roller member is disposed in the at least one second position track, the at least one second position track physically inhibits the at least one roller member from exiting the at least one second position track except through the one or more combination inlet(s)/outlet(s); and
wherein the at least one roller member is edible.

2. The pet treat dispenser toy of claim 1, further comprising:
wherein the at least one roller member is spherical.

3. The pet treat dispenser toy of claim 1, further comprising:
wherein the at least edible one roller member comprises a plurality of edible roller members rollable simultaneously within the at least one first position track or the at least one second position track.

4. The pet treat dispenser toy of claim 1, further comprising:
wherein the plurality of first-half track segments and the plurality of second-half track segments all have a same undercut profile;
wherein the undercut profile is a semi-circular undercut profile.

5. The pet treat dispenser toy of claim 1, further comprising:
wherein the plurality of first-half track segments include a first-half first track segment and a first-half second track segment;
wherein the plurality of second-half track segments include a second-half first track segment and a second-half second track segment.

6. The pet treat dispenser toy of claim 5, further comprising:
wherein, when the first-half and the second-half are in the first position of the pet treat dispenser toy, the at least one first position track comprises a first position first track which includes the first-half first track segment and the second-half first track segment;

wherein, when the first-half and the second-half are in the second position of the pet treat dispenser toy, the at least one second position track includes the first-half second track segment and the second-half second track segment.

7. The pet treat dispenser toy of claim 6, further comprising:

wherein, when the first-half and the second-half are in the first position of the pet treat dispenser toy, the at least one first position track further comprises a first position second track which includes the first-half second track segment and the second-half second track segment.

8. The pet treat dispenser toy of claim 6, further comprising:

wherein, when the first-half and the second-half are in the second position of the pet treat dispenser toy, the at least one second position track further includes the first-half first track segment and the second-half first track segment.

9. The pet treat dispenser toy of claim 5, further comprising:

wherein the plurality of first-half track segments further include a first-half third track segment;

wherein the plurality of second-half track segments further include a second-half third track segment.

10. The pet treat dispenser toy of claim 9, further comprising:

wherein, when the first-half and the second-half are in the first position of the pet treat dispenser toy, the at least one first position track further comprises a first position first track which includes the first-half first track segment and the second-half first track segment;

wherein, when the first-half and the second-half are in the first position of the pet treat dispenser toy, the at least one first position track further comprises a first position second track which includes the first-half second track segment and the second-half second track segment;

wherein, when the first-half and the second-half are in the first position of the pet treat dispenser toy, the at least one first position track further comprises a first position third track which includes the first-half third track segment and the second-half third track segment.

11. The pet treat dispenser toy of claim 10, further comprising:

wherein, when the first-half and the second-half are in the first position of the pet treat dispenser toy, the first position first track, the first position second track and the first position third track are isolated from one another.

12. The pet treat dispenser toy of claim 10, further comprising:

wherein the first position first track further comprises a first position first continuous loop track;

wherein the first position second track further comprises a first position second continuous loop track;

wherein the first position third track further comprises a first position third continuous loop track.

13. The pet treat dispenser toy of claim 9, further comprising:

wherein, when the first-half and the second-half are in the second position of the pet treat dispenser toy, the at least one second position track includes the first-half first track segment, the second-half first track segment, the first-half second track segment, the second-half second track segment, the first-half third track segment and the second-half third track segment.

14. The pet treat dispenser toy of claim 10, further comprising:

wherein the at least one second position track further comprises a second position continuous loop track.

15. The pet treat dispenser toy of claim 1, further comprising:

wherein the first-half and the second-half are rotatable relative to one another from the first position of the pet treat dispenser toy to the second position of the pet treat dispenser toy about a rotation axis;

wherein the first-half and the second-half are releasably fixable relative to one another around the rotation axis at the first position of the pet treat dispenser toy and the second position of the pet treat dispenser toy.

16. The pet treat dispenser toy of claim 15, further comprising:

wherein the first-half and the second-half are releasably fixable relative to one another around the rotation axis at the first position of the pet treat dispenser toy and the second position of the pet treat dispenser toy by a detent mechanism.

* * * * *